United States Patent [19]

Colas et al.

[11] 3,767,857

[45] Oct. 23, 1973

[54] DISTRIBUTIVE IMMEDIATE RINGING CIRCUITS FOR A TELEPHONE SYSTEM

[75] Inventors: Jean D. Colas; Robert Leblan; Henry Schiesser, all of Vence, France

[73] Assignee: International Business Machines Corporation, Armonk, N.Y.

[22] Filed: Feb. 24, 1972

[21] Appl. No.: 228,973

[30] Foreign Application Priority Data

Mar. 11, 1971 France .............................. 7110278

[52] U.S. Cl. .............................................. 179/18 HB

[51] Int. Cl. .............................................. H04m 3/04

[58] Field of Search.................................. 179/18 HB

[56] References Cited

UNITED STATES PATENTS 3,443,033 5/1969 Louis ......................... 179/18 HB X 3,492,437 1/1970 Feiner et al. .................. 179/18 HB

*Primary Examiner*—Thomas W. Brown

*Attorney*—Delbert C. Thomas et al.

[57] ABSTRACT

In a data processor controlled telephone system, the generator which supplies the ringing current is saved from overload conditions during any part of a ringing period by distributing the times of connection of the phones being powered for ringing across the entire ring period. A table is provided with an entry location for each of a number of time slots into which a ringing period is divided. Only a limited number of called line addresses can be stored within each entry location. The locations are continuously scanned and entry of a called line address is controlled, so that the address will be stored in the first entry location scanned and found to have available storage space. This algorithm will start ringing signals to a called line as soon as it can be arranged without momentary overloading of the generator.

4 Claims, 7 Drawing Figures

DISTRIBUTIVE IMMEDIATE RINGING CIRCUITS FOR A TELEPHONE SYSTEM

BACKGROUND OF THE INVENTION

This invention relates to the distribution of a periodical signal and, in particular, to the distribution of the ringing signal to the called lines in a telephone exchange system.

In many telephone exchange systems, the ringing signal results from the time division of a continuous tone provided by a generator. To avoid overloading this generator, the ring pulses are not applied simultaneously to all the called line, but are distributed in the time division over a ringing period. In general, the lines are distributed in groups, a ring circuit is assigned to each group, with each circuit receiving the ring pulses at given times distributed so that the generator continuously feeds the same number of circuits. When a line is called, it is connected to the ring circuit assigned to its group, and receives the pulses applied to this circuit.

There is an improvement of this system in which the lines are not continuously assigned to a distribution circuit, but when a called line is connected to the network, it is assigned to the distribution circuit transmitting a ring pulse at the time this connection is made. Then, ringing starts immediately, while in the case of a fixed assignment, a great part of the ring signal period could elapse between the time the connection is made and the effective beginning of ringing.

These systems have an important disadvantage. If a great number of lines belonging to a same group are called at about the same time, (in the fixed assignment system) or if a great number of called lines are connected to the ringing network in the same time division, (in the system provided with the above-mentioned improvement) the generator can be overloaded in some time intervals and supplying an energy below its capacity during the remaining time intervals.

OBJECTS OF THE INVENTION

The present invention avoids this overload-underload disadvantage. It is a primary object of this invention to provide a process for distributing an intermittent signal resulting from the time division of a continuous signal and in which process the capacity of the signal generator is used in the best possible way.

Another object of this invention is to provide devices for implementing this process.

The objects of the invention are reached by means of the following arrangements:

1. The lines are not permanently assigned to a given signal distribution circuit, but the assignment of a line to a circuit is made when the line is identified as a called line.

2. This assignment is made taking into account the number of lines already assigned to a distribution circuit.

In the preferred embodiment of the invention, a called line is assigned to the distribution circuit which receives the first of the pulses beginning after the time the line is identified as a called line provided that this assignment is compatible with the load of the generator; if not, the line is assigned to the distribution circuit which receives the next following pulse, and so on. If any distribution circuit cannot receive the line without overloading, supplying of the ringing signal to the line is delayed or cancelled in accordance with the particular arrangements provided for operation.

The distribution circuits involved above are not necessarily physical circuits. They can consist in recorded information tables defining the time slots at which the lines assigned to these distribution "circuits" should be connected to or disconnected from a common circuit transmitting the continuous signal to be devided.

The foregoing and other objects, features, and advantages of the invention will be apparent from the following more particular description of the preferred embodiment thereof as illustrated in the accompanying drawings.

DETAILED DESCRIPTION

The basic structural features of the telephone system, with which the preferred embodiment of the invention is described, are set out in assignee's U.S. Pat. No. 3,513,263, issued May 19, 1970 to M. Bastian et al.

Figure 1:
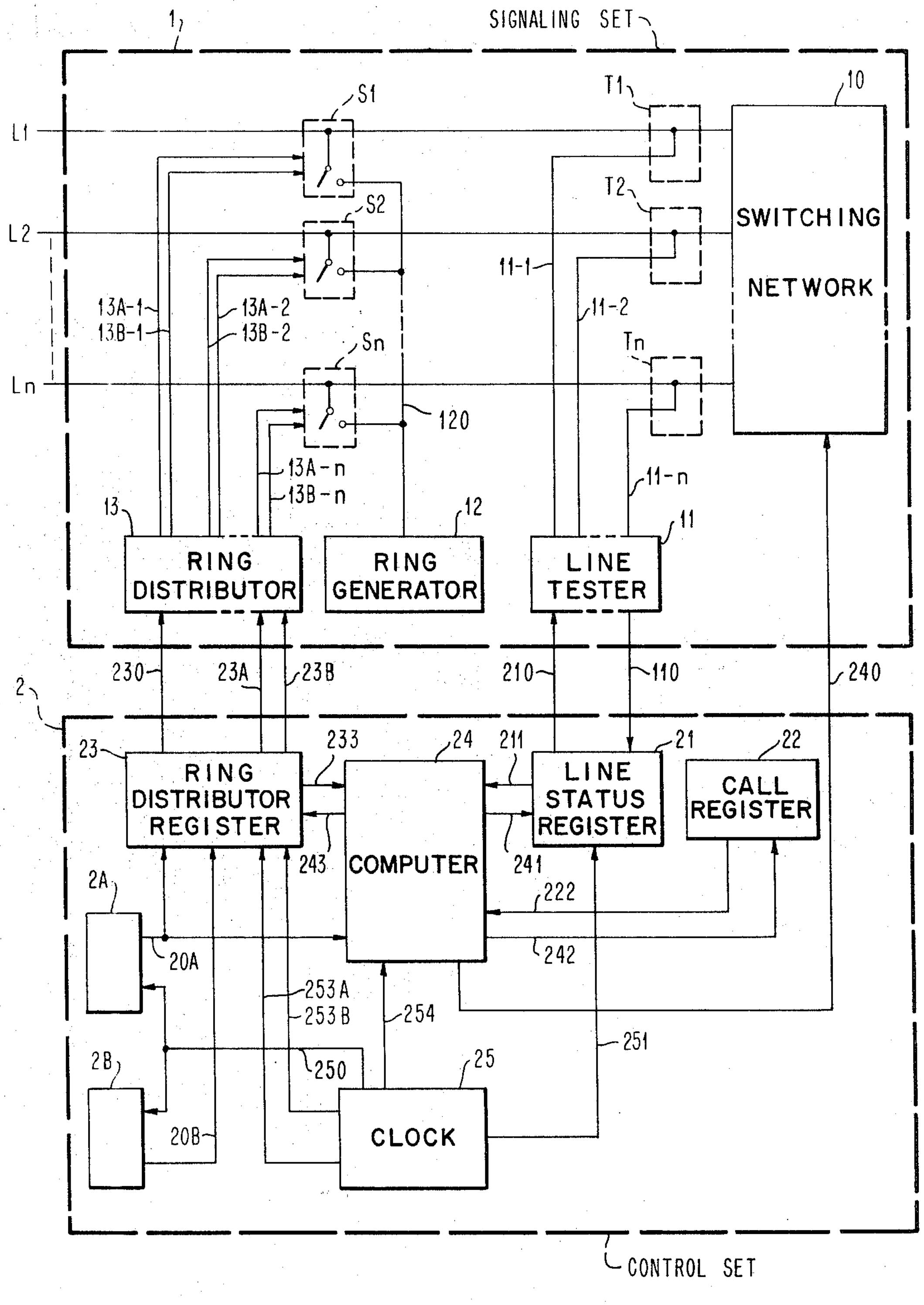
FIG. 1 shows a general diagram of a system of this invention.

FIG. 1 shows a system of the invention in the form of a block diagram in which the elements are represented as simple rectangles. The connections between the elements (transmission of information or commands) are represented as lines; however, many of the connections represented as a line will actually be realized by means of a set of several conductors.

The system shown in FIG. 1 includes:

a switching and signalling set 1 (enclosed in dotted lines) to which subscribers' lines L1, L2, . . . Ln are connected;

a control set 2 which generates the control signals applied to the circuits of set 1.

Set 1 includes the following elements:

a switching network 10;

a line testing device 11 connected through lines 11–1, 11–2, . . . **11–*n*** to test points T1, T2, . . . Tn located on the subscribers' lines;

a ring current generator 12; this generator provides a permanent alternating current on a ring circuit 120 which is connected to lines L1, L2, . . . Ln through switches S1, S2, . . . Sn;

a ring distributor 13 which can supply to switches S1, S2, . . . Sn, connection commands through lines 13 A-1, 13 A-2, . . . 13 A-n and disconnection commands through lines 13 B-1, 13 B-2, . . . 13 B-n.

As the elements of the signalling set 1 are well known in the prior art of telephone switching, they won't be described in detail. However, it should be noted that some of these elements, such as test points T1, T2, . . . Tn, and switches S1, S2, . . . Sn are very schematically shown on the drawing and can comprise many electronic circuits. In addition, the other elements which can be contained in switching and signalling set 1, such as the dial tone supply circuits, have not been indicated since these elements do not intervene in the operation of the invention.

Control set 2 comprises the following elements:

a line status register 21, which can supply the addresses of the subscribers' lines to be checked to testing device 11, through a line 210, and receive from this testing device, through a line 110, signals concerning the status of the checked subscribers' lines;

a call register 22, which can record information concerning the calls in progress;

a ring distribution register 23; this register can supply to ring distributor 13, through line 230, the addresses of the subscribers' lines on which a ring pulse is to be started or stopped, the nature of the operation being specified by a signal applied to a line 23 A when a connection to ring circuit 120 is involved, (pulse starting) or to a line 23 B when a disconnection is involved (pulse stopping);

a data processing element 24 capable of receiving data issued from registers 21, 22, and 23, through lines 211, 222, and 233 respectively, processing the data and supplying to said registers, through lines 241, 242, and 243, information resulting from these treatments; data processing element 24 can also supply to switching network 10, through line 240, marking commands or other commands concerning switching;

a first cyclic counter 2 A and a second cyclic counter 2 B; both counters increase at regular intervals. The duration of said intervals is the same for both counters, as is the duration of the cycle of the counters, but the indications of these counters are shifted as will be explained later. The status of counter 2 A is transmitted to ring distribution register 23 and to processing element 24 through line 20 A and the status of counter 2 B is transmitted to ring distribution register 23 through line 20 B;

a timing signal generator 25. This generator supplies signals dividing the time in periods called "ring periods," the duration of which is of 3.2 seconds in this example. Additionally, it supplies signals dividing each ring period in time intervals equal to one-sixteenth of the ring period, i.e., 200 milliseconds. During each interval, it supplies signals causing various elements of the system to operate, as explained later. These various signals are transmitted to the elements of control set 2 through lines 250, 251, 253 A, 253 B, 254, as indicated in the drawing; in the following description, these timing signals will bear the same references as the lines transmitting them.

Details will not be given on the construction of data processing element 24, cyclic counters 2 A and 2 B and timing signal generator 25, since these elements can be of any conventional type. The operations performed by these elements in the system will be explained later, when describing the operation of the system. However, line register 21, call register 22 and ring distribution register 23 will be described below in a more detailed fashion with reference to FIGS. 2, 3, and 4.

Line Status Register 21

This register includes a logically arranged memory in the form of a table and control circuits.

Figure 2:
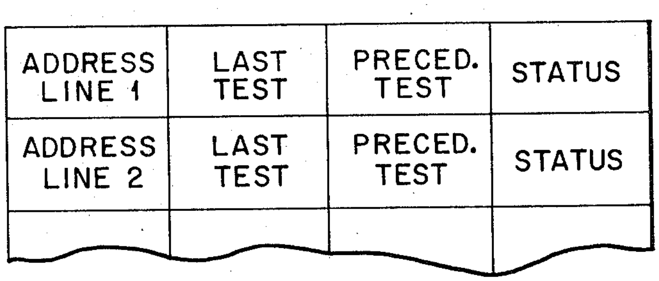
FIG. 2 shows in detail, the table contained in the line status register indicated in FIG. 1.

The constitution of the table is shown in FIG. 2. This table is divided into a number of zones equal to the number of subscribers' lines, one zone being associated to each line. Each zone contains the system address of the associated line and information indicating:

a. The connection state of the line with the switching network (connected or disconnected line).

b. The status of the subscribers' set served by the line ("on-hook or off-hook" status).

c. The line "status" (for example, for a calling line; line on number input, standing-by line, speaking line, etc., and for a called line, ringing line, speaking line, etc.).

Information catagories (*a.*) and (*b.*) are transmitted by testing device 11, and can be stored in the table to present the information resulting from two or more consecutive tests, which enables data processing element 24 to detect status changes. Information (c.) is supplied by data processing element 24.

The control circuits of the line status register 21, actuated by a timing signal 251 from clock 25, control scanning of the subscribers' lines by successively supplying the addresses of these lines to testing device 11 which decodes said addresses and supplies the corresponding information (a.) and (b.) to line status register 21.

Call Register 22

Figure 3:
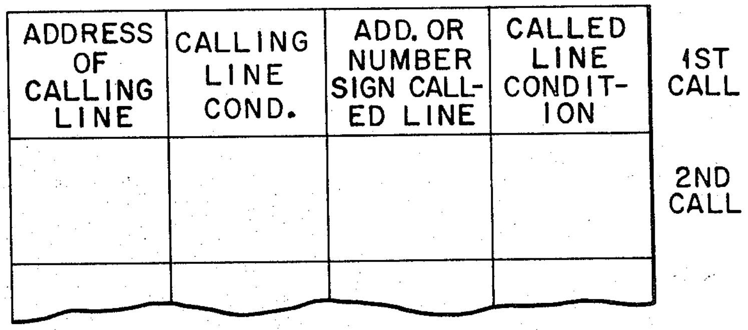
FIG. 3 shows the table contained in the call register indicated in FIG. 1.

This register essentially consists of a storage unit having a table divided into zones, the number of zones being equal to the highest number of calls which can be processed at the same time. This table is schematically shown in FIG. 3. Each zone includes the following regions:

A "calling line address" region in which the processing element can introduce the system address of a line when this line is identified as a calling line.

A "calling line status" region in which the data processing element places the information concerning the "status" as defined in (c.) above.

A "called line address or number" region in which the information resulting from digit entries is kept up to date by the data processing elements 24. At the end of digit entering, this region receives the system address of the line identified by said numbering and elaborated as needed by data processing element 24.

A "called line status" region is which the data processing element 24 puts the information from register 21 concerning the "status" of the called line.

Ring Distribution Register 23

This register is used to implement the principles of the invention and includes a storage section logically arranged in table form and control circuits.

Figure 4:
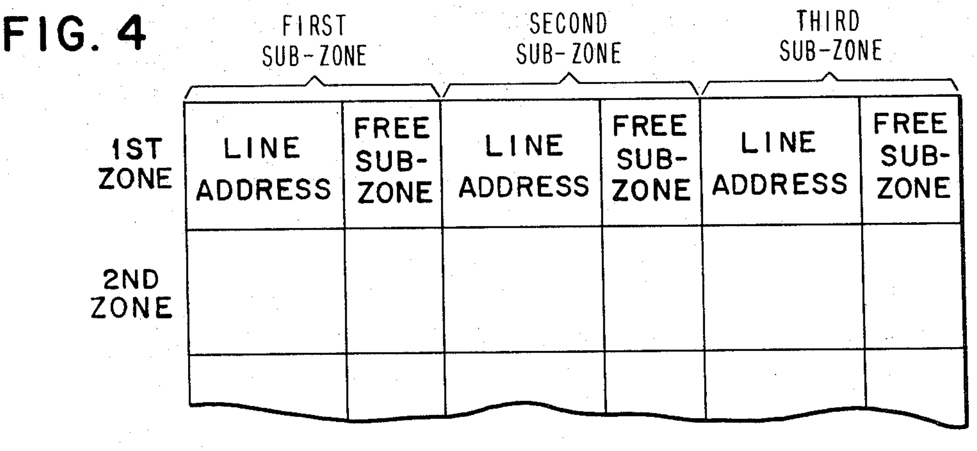
FIG. 4 shows the table contained in the ring distribution register indicated in FIG. 1.

The constitution of the table in register 23 is shown in FIG. 4. This table is divided into a number of zones equal to the number of time intervals included in a ring period, i.e., 16 in this example. Each zone is divided into a number of sub-zones equal to the number of lines which can receive a ring pulse starting command during the corresponding time interval. Let us assume that this number is equal to three, which gives a total of 48 sub-zones. Each sub-zone includes a storage region which can record the system address of a line and a storage region which can record information indicating whether or not the sub-zone is free.

The control circuits are placed under control of timing signals 253 A and 253 B supplied by generator 25, and use the counting information received from counters 2 A and 2 B to supply the following to ring distributor 13:

The addresses of the subscribers' lines from the sub-zones contained in the zone indicated by counter 2 A and a signal transmitted by line 23 A to control connection of the addressed subscribers' lines to the ring circuit.

The addresses of the subscribers' lines contained in the sub-zones of the zone indicated by counter 2 B and a signal transmitted by line 23 B to control disconnection of said subscribers' lines.

Figure 6:
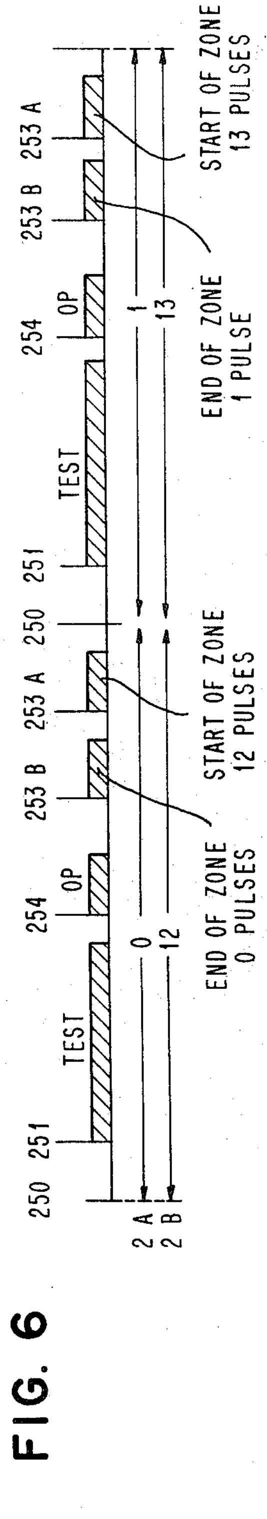
FIG. 6 shows, with more detail, the timing diagram of the operations carried out during a fraction of the ring period.
Figure 7:
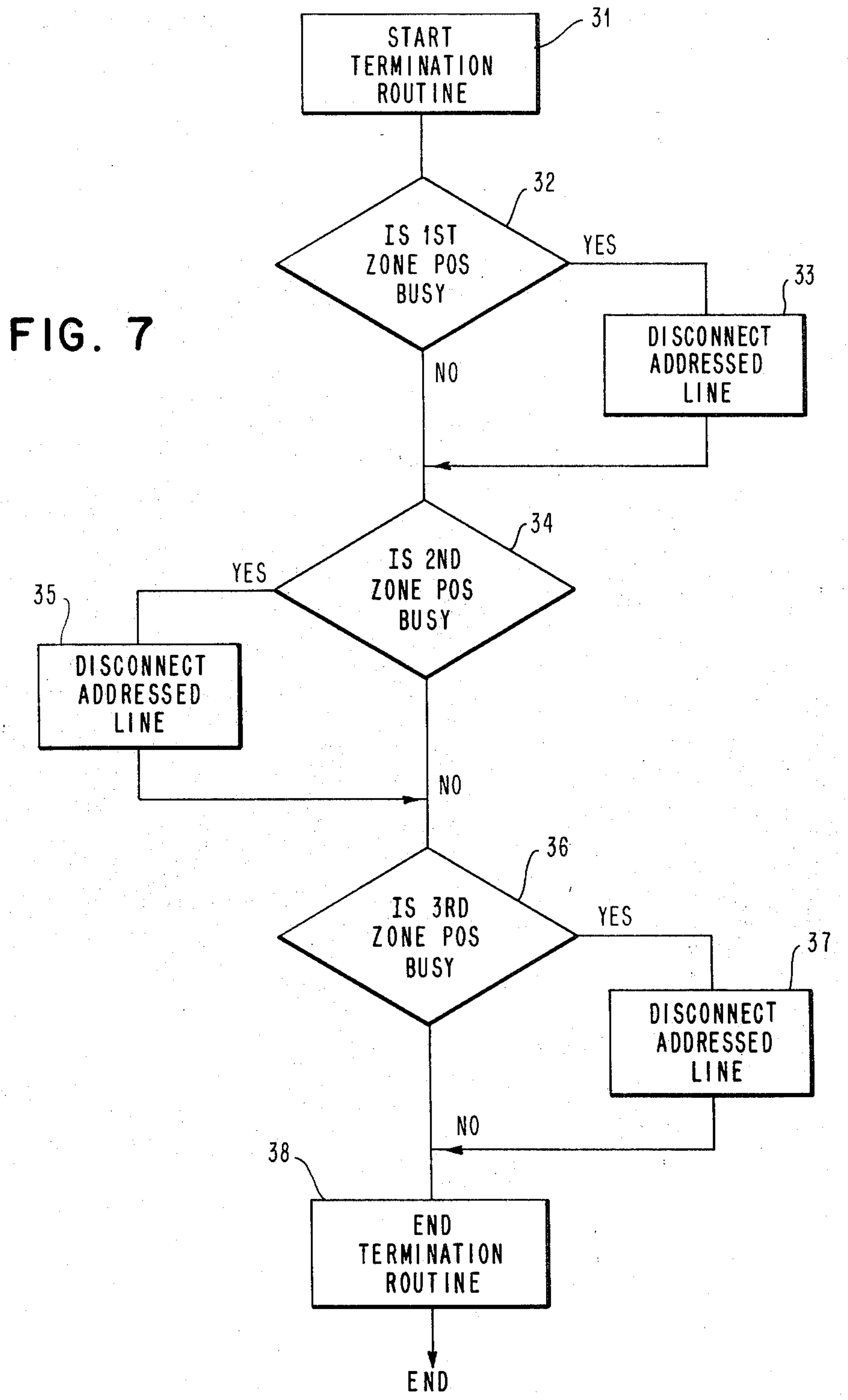
FIG. 7 shows a schematic diagram of the ring distribution operation.

The operation of the system will now be described referring to FIGS. 5, 6, and 7.

Figure 5:
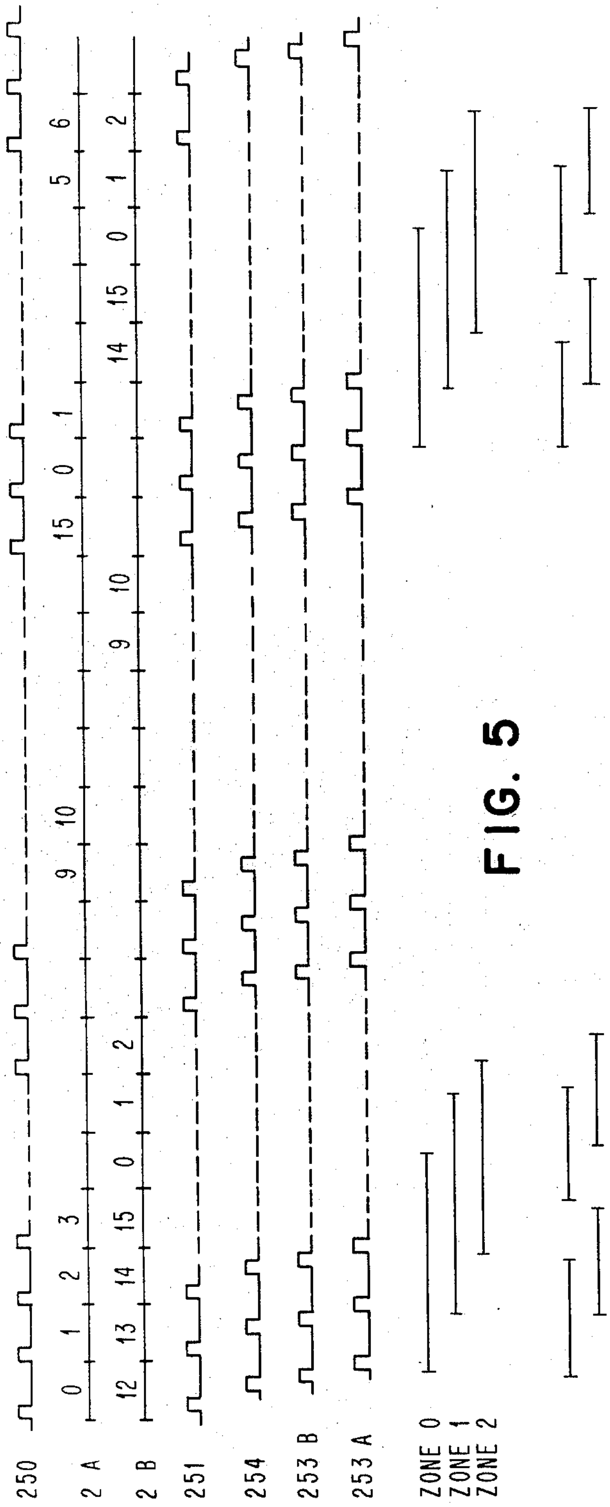
FIG. 5 is a timing diagram showing the sequence of controlling signals over several ring periods.

FIG. 5 shows a timing diagram of the signals supplied by timing signal generator 25 and various actions controlled by these signals.

The first line of FIG. 5 shows "increment" signals 250 supplied to counters 2 A and 2 B. It is assumed that the incrementing of these counters is simultaneous, although this is not absolutely necessary.

The second line shows the indications of counter 2 A and the third line shows the indications of counter 2 B. The indications of the second counter are shown as delayed by 4 units with respect to the indications of the first counter, in order to control the end of the ring pulses 4 time intervals, i.e., 800 milliseconds, after the beginning of these pulses.

The following four lines show the timing signals supplied to:

line status register 21 (signal 251) to control a test sweep.

data processing element 24 (signal 254) to control starting of a processing and computing program.

ring distribution register 23 (signal 253 B) to control the delivery of end of ring pulse commands.

same register (signal 253 A) to control the delivery of beginning of ring pulse commands.

The following lines show the duration of ring pulses on the lines whose addresses are recorded in zones 0, 1, 2, of the table in register 23, these pulses being started by a signal supplied on line 23 A when the number indicated by counter 2 A coincides with the number of the zone and clock line 253 A is pulsed and being terminated by a signal supplied on line 23 B when the number indicated by counter 2 B coincides with the number of the zone, and line 253 B is energized.

The last two lines (not referenced) of FIG. 5 respectively show the ring pulses on lines whose addresses are recorded in zones 0 and 1, in another possible embodiment of this invention.

The various operations performed during a time interval will be described referring to FIG. 6, which shows in large scale the first two time intervals of the diagram of FIG. 5.

At the beginning of the first interval, actuated by timing signal 250, counter 2 A passes to value 0 and counter 2 B passes to value 12. After a time required for these counters to trip has elapsed, generator 25 delivers a signal 251 which fires, in register 21, a test sweep control routine. This sweep can be performed by using testing means already known in the prior telephone art and which need not be further described here: it consists in successively supplying to testing device 11, the addresses of the lines to be tested and to record, for each line, in the corresponding storage area of register 21, information concerning the result of the test.

After the end of a sweep, clock generator 25 supplies to data processing element 24, a signal 254 which causes starting of a known up-dating routine for information concerning the network. This up-dating, carried out from the information contained in register 21, in call table 22, and in the internal memories of the data processing element, includes in particular, the following operations:

detection of new calling lines and insertion of the address of these lines in call register 22;

detection and recording of the digit signals supplied by the calling lines;

analysis of the recorded digit signals and determination of the address of the called line;

introduction of this address in call register 22, FIG. 3, in correspondence with the address of the calling line;

search for a free circuit to connect the called line to the calling line;

supply a marking signal to switching network 10 to control connection of the called line;

introduction, into registers 21 and 22, of signals indicating the line "status."

The implementation of the above operations under control of a data processing element, is well known in the prior art of telephone switching. However, in the system of this invention, the data processing element also controls an up-dating of the tables of ring distribution register 23.

This up-dating follows the connection of the new called lines. For each new called line, the computer controls a sweep of the ring table to search for a free sub-zone of ring distribution register 23, i.e., a sub-zone which does not contain any line address. This sweep is performed starting with the zone which corresponds to the one indicated at that time by counter 2 A (information transmitted by line 20*a*). Should a free address location exist in this zone, the computer places the address of the new called line in it. If not, it searches for a free address location in the next zone, and if it finds such a location, it places the address of this new called line in it. If not, it proceeds in the following zone, and so on, until a complete sweep of the ring table is performed. If no free location of the table is found, the computer controls disconnection of the called line and supply of a dissuasion tone to the calling line.

After the end of the implementation of the data processing unit routine, generator 25 supplies a timing signal 253 B which controls ring pulse terminating operations. These operations are performed by the control circuits of ring distribution register 23 following a very simple routine shown by the diagram of FIG. 7 in which the lozenges and rectangles have the following meanings:

31 — start of the signal distribution terminating routine.

32 — is the first sub-zone of the zone indicated by counter 2 B occupied.

33 — supply the disconnection signal on the line 13 B-x corresponding to the address recorded in this position.

34 — is the second sub-zone of this zone occupied.

35 — supply the disconnection signal on the line 13 B-x corresponding to the address in this position.

36 — is the third sub-zone of this zone occupied.

37 — supplied the disconnection signal on the line 13 B-x corresponding to this position.

38 — supply an end of distribution signal to the data processing element.

Then, similar operations are carried out following timing signal 253 A. But this time, the tested locations are the sub-zones of the zone indicated by counter 2 A and the supplied signals are connection signals which are transmitted on lines 13 A-x corresponding to the addresses read at the corresponding sub-zones.

Thus, switch Sx corresponding to a called line Lx is opened and closed successively, which cancels or re-establishes the connection of this line Lx with ring circuit 120, and thus, times the ringing signal. The duration of a ring pulse is equal to the duration of the number of time intervals which separate the successive passages of counters 2 A and 2 B through the same value, for example, 800 milliseconds if counter 2 B is delayed by 4 units with respect to counter 2 A, and the time interval which separates the beginning of two ringing pulses on a line is equal to a complete cycle of one of these counters, for example: 3.2 seconds if the counters are provided with 16 positions.

Ringing is automatically stopped when the user of the called line removes his receiver. But, to avoid the re-establishment of said ringing at the end of the call and also to free sub-zones of the table of ring distribution in register 23 for new calls, it is necessary to erase the address of the called line in this table and to replace it by a free location signal. For this purpose, when the computer 24 detects that a called line whose address is in the connection table has passed from the "ringing" status to the "speaking" status, it causes a sweep of table 23 to be carried out to search for this address, to control its erasing and to write the free location signal. The same operations are controlled if the computer 24 detects that, in call register 22, the calling line connected to this called line has passed from the "stand by" position to the "on-hook" position.

Many modifications can be applied to the system described above. In particular, it is possible to use a ringing timing comprising two pulses per period instead on one. For this, it is necessary to use four counters instead of two (two of these counters would control the connection and the other two counters would control the disconnection) and to shift said four counters in accordance with the selected timing. The last two lines of FIG. 6 show, as an example, the timing obtained with the same time intervals as in the previous example (200 ms) and the same ringing period (3.2 seconds corresponding to a counting of 16 intervals), but with three of the counters respectively shifted by two, three, and five units with respect to the first counter.

It has been assumed in the foregoing that various registers 21, 22, 23 are particular elements, each having their own memories and their own control circuits. The partial or total integration of a part or all of these elements into the control circuits and storages of data processing element 24 may be made without departing from the spirit and scope of the invention.

Also, search for a free sub-zone in ring distribution register 23 may be performed by following a routine different from the one described above without departing from the spirit and scope of the invention; for example, said search can be performed so as to try to distribute in time the load or ring generator 12, in as uniform a manner as possible. In this case, the beginning of the ring signal on a line could be slightly delayed but the ring generator would not be overlaoded and the main object of the invention would be reached.

While this invention has been particularly shown and described with reference to several embodiments thereof, it will be understood by those skilled in the art that various changes in form and detail may be made without departing from the spirit and scope of the invention.

What is claimed is:

1. In a switching network for the ringing power of a telephone communication system of the type having a plurality of terminals with each terminal including a ringing circuit and at least one status indicating switch, a common ringing power generator and individually operable devices to selectively connect and disconnect said terminals and said generator, the improvement comprising:

an address storage unit to hold a plurality of addresses designating terminals to be connected to said generator, said storage unit being divided into groups of storage locations with a fixed number of address storage locations in each group;

a first cyclic counter incremented at uniform time intervals through a range of count values equal to the number of said address groups, each count value of said counter corresponding to one of said groups of storage locations;

a second cyclic counter similar to said first cyclic counter, but having its count values delayed by a fixed number of said uniform time intervals from corresponding count values in said first counter;

a ringing power distribution means controlled by said first cyclic counter and by the terminal addresses stored in the group of address storage locations corresponding to the count then present in said first cyclic counter to close corresponding ones of said devices to connect said ringing power generator to the ones of said terminal ringing circuits designated by said terminal addresses; and a ring power interrupting means controlled by said second cyclic counter and by the terminal addresses stored in the group of address storage locations corresponding to the count then present in said second cyclic counter to open corresponding ones of said devices to disconnect from said generator the ringing circuits of the terminals designated by the addresses stored in said group of locations, whereby the number of ringing circuits simultaneously powered by said generator is limited to those terminals designated by the addresses stored in the groups of storage locations which have been indicated by said first cyclic counter and not indicated later by said second cyclic counter.

2. In a switching network for the ringing power of a telephone communication system of the type having a plurality of terminals with each terminal including a ringing circuit and at least one status indicating switch, a common ringing power generator and individually operable devices to selectively connect and disconnect said terminals and said generator, the improvement comprising:

an address storage unit to hold a plurality of addresses designating terminals to be connected to said generator, said storage unit being divided into groups of storage locations with a fixed number of address storage locations in each group;

a first cyclic counter incremented at uniform time intervals through a range of count values equal to the number of said address groups, each count value of said counter corresponding to one of said groups of storage locations;

a second cyclic counter similar to said first cyclic counter, but having its count values delayed by a fixed number of said uniform time intervals from corresponding count values in said first counter;

a ringing power distribution means controlled by said first cyclic counter and by the terminal addresses stored in the group of address storage locations corresponding to the count then present in said first cyclic counter to close corresponding ones of said devices to connect said ringing power generator to the ones of said terminal ringing circuits designated by said terminal addresses; and a ring power interrupting means controlled by said second cyclic counter and by the terminal addresses stored in the group of address storage locations corresponding to the count then present in said second cyclic counter to open corresponding ones of said devices to disconnect from said generator the ringing circuits of the terminals designated by the addresses stored in said group of locations, whereby the number of ringing circuits simultaneously powered by said generator is limited to those terminals designated by the addresses stored in the groups of storage locations which have been indicated by said first cyclic counter and not indicated later by said second cyclic counter;

a data processing system responsive to signals from the status switches of all of said terminals to identify a terminal for connection to said common generator;

means in said processing system to then test the address locations within the group of address storage locations indicated by the count in said first cyclic counter for identification of an inactive storage location;

transfer means activated by said processing system for transferring the address of said identified terminal into said identified inactive storage location; and a further means in said processing system to retain the address of an identified terminal until an inactive storage location is found in a later tested group, when the first tested group has no inactive storage locations.

3. A switching network as set out in claim 2, including:

further means in said processing system responsive to said status switch signals of said terminals to identify a terminal which is to have a ringing signal discontinued; and scanning circuits controlled by said processing system to scan all of said address storage locations to determine the storage location having the address of said terminal to be disconnected from said generator and to render said storage location inactive.

4. A distributing system to cyclically connect selected circuits to a power source for a part cycle interval, said system comprising:

a switch for each circuit to connect it to said power source;

a control means for each switch to close and open it;

a source of timing signals;

a first cyclic counter operated by said timing source to define said cycle and integral parts thereof by its count values;

a second cyclic counter also operated by said timing source in the same time cycle as said first cyclic counter but having its count values delayed by a fixed interval from corresponding count values in said first counter;

an address storage for retaining the identifications of said circuits selected for connection to said power source, said storage being divided into groups of address storage locations, each group corresponding to a different count value of said cyclic counters and all groups having the same number of address locations;

means controlled by said first cyclic counter at each count value thereof to select a corresponding group of address locations;

circuits controlled by the addresses stored in the selected group of address locations to activate said control means for the corresponding switches;

means controlled by said second cyclic counter at each count value thereof to also select a corresponding group of address locations; and other circuits controlled by the addresses stored in the group of address locations selected under control of said second cyclic counter to deactivate the control means for the corresponding switches whereby each circuit whose address is stored in one of said storage locations will be connected to said power source for a predetermined part of the cycle time of said counters.

* * * * *